United States Patent
Aikens et al.

(10) Patent No.: US 8,169,633 B2
(45) Date of Patent: May 1, 2012

(54) METHOD AND APPARATUS FOR ATTEMPTED SECURE PRINT JOB RELEASE NOTIFICATION

(75) Inventors: Andrew J. Aikens, Webster, NY (US); Zhun Huang, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 902 days.

(21) Appl. No.: 12/207,090

(22) Filed: Sep. 9, 2008

(65) Prior Publication Data
US 2010/0007907 A1    Jan. 14, 2010

Related U.S. Application Data

(63) Continuation-in-part of application No. 12/168,998, filed on Jul. 8, 2008.

(51) Int. Cl.
*G06K 15/00* (2006.01)
(52) U.S. Cl. ..................................... 358/1.14
(58) Field of Classification Search ........................ None
See application file for complete search history.

(56) References Cited

U.S. PATENT DOCUMENTS

| | | | |
|---|---|---|---|
| 6,567,180 B1 * | 5/2003 | Kageyama et al. | 358/1.15 |
| 6,819,445 B1 | 11/2004 | Stevenson et al. | |
| 2002/0065729 A1 * | 5/2002 | Guillemin et al. | 705/24 |
| 2002/0104026 A1 * | 8/2002 | Barra et al. | 713/202 |
| 2003/0227647 A1 * | 12/2003 | Gallacher | 358/1.15 |
| 2004/0246513 A1 * | 12/2004 | McKinley et al. | 358/1.14 |
| 2005/0275866 A1 * | 12/2005 | Corlett | 358/1.14 |
| 2006/0072149 A1 * | 4/2006 | Justice | 358/1.15 |

* cited by examiner

*Primary Examiner* — Benny Q Tieu
*Assistant Examiner* — Jeremiah Bryar
(74) *Attorney, Agent, or Firm* — Ronald E. Prass, Jr.; Prass LLP

(57) ABSTRACT

A method and apparatus for notifying a user of an attempted secure print job release from an image production device is disclosed. The method may include receiving a secure print job and secure print job instructions from a user, wherein the secure print job instructions include at least a pass code and the user's contact information, determining if a pass code has been entered for the user's secure print job, wherein if it is determined that a pass code has been entered for the user's secure print job, determining if the entered pass code is correct, wherein if it is determined that the entered pass code is correct, sending a signal to print the secure print job and notifying the user in accordance with the user's contact information that the secure print job has been printed, otherwise, notifying the user in accordance with the user's contact information that an unauthorized user attempted to print the secure print job.

21 Claims, 4 Drawing Sheets

METHOD AND APPARATUS FOR ATTEMPTED SECURE PRINT JOB RELEASE NOTIFICATION

PRIORITY INFORMATION

This application claims priority as a continuation-in-part of co-pending U.S. patent application Ser. No. 12/168,998, filed Jul. 7, 2008, the contents of which are incorporated herein by reference.

BACKGROUND

Disclosed herein are a method and apparatus for attempted secure print job release notification from an image production device.

Most current printers and multifunctional devices support a secure print feature. The secure print feature may allow users to protect a confidential document that they may not want others to view or take, by requiring the user to be at the image production device when the print job prints out. In most cases, the user selects this function, and then walks to the device to release the job. However, some users may leave the print job on the device for an extended period of time (e.g., forget about the print job, send it to the wrong printer, etc.).

In conventional devices, the print job will stay resident on the image production device until it is either released or deleted by the authorized user at the image production device user interface or manually deleted by a system administrator. The issue with this implementation is that the user does not control or receive any notification of any attempts to release or delete their secure print job(s) while he or she is not present at the image production device. This issue may pose a security risk depending upon the security policies of the organization.

SUMMARY

A method and apparatus for notifying a user of an attempted secure print job release from an image production device is disclosed. The method may include receiving a secure print job and secure print job instructions from a user, wherein the secure print job instructions include at least a pass code and the user's contact information, determining if a pass code has been entered for the user's secure print job, wherein if it is determined that a pass code has been entered for the user's secure print job, determining if the entered pass code is correct, wherein if it is determined that the entered pass code is correct, sending a signal to print the secure print job and notifying the user in accordance with the user's contact information that the secure print job has been printed, otherwise, notifying the user in accordance with the user's contact information that an unauthorized user attempted to print the secure print job.

DETAILED DESCRIPTION

Figure 1:
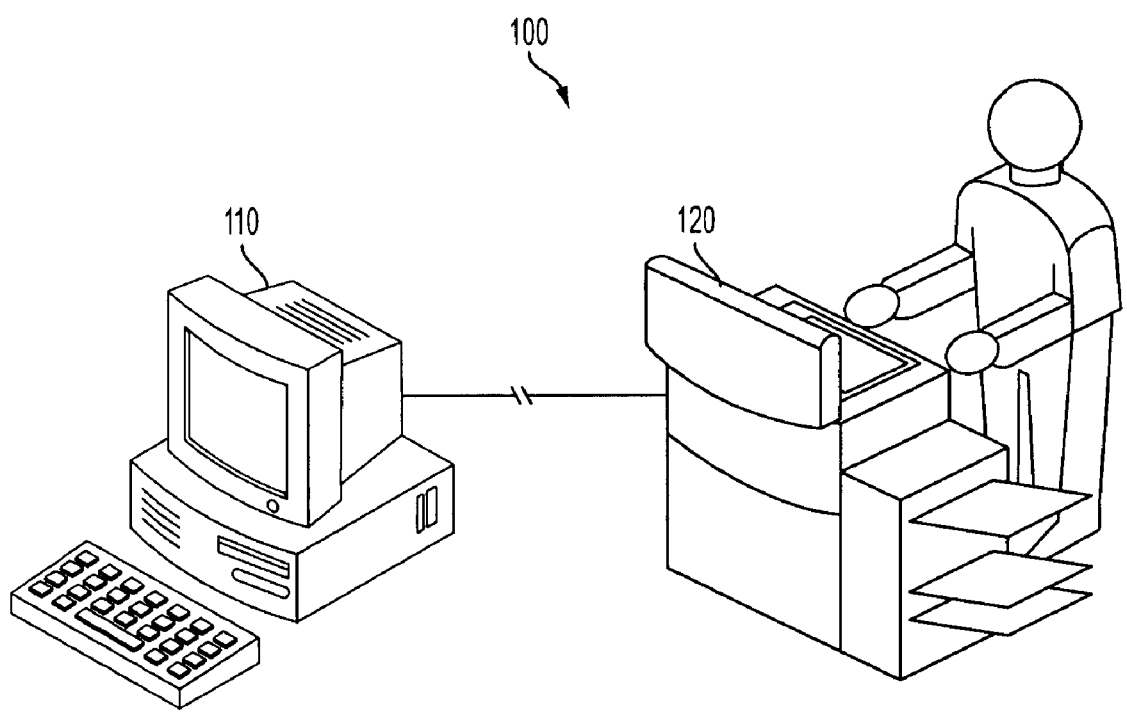
FIG. 1 is an exemplary diagram of an image production environment in accordance with one possible embodiment of the disclosure.

Aspects of the embodiments disclosed herein relate to a method and apparatus for attempted secure print job release notification from an image production device.

The disclosed embodiments may include a method for notifying a user of an attempted secure print job release from an image production device. The method may include receiving a secure print job and secure print job instructions from a user, wherein the secure print job instructions include at least a pass code and the user's contact information, determining if a pass code has been entered for the user's secure print job, wherein if it is determined that a pass code has been entered for the user's secure print job, determining if the entered pass code is correct, wherein if it is determined that the entered pass code is correct, sending a signal to print the secure print job and notifying the user in accordance with the user's contact information that the secure print job has been printed, otherwise, notifying the user in accordance with the user's contact information that an unauthorized user attempted to print the secure print job.

The disclosed embodiments may further include an image production device that may include a memory, and a secure print manager that receives a secure print job and secure print job instructions from a user and stores the secure print job in the memory, wherein the secure print job instructions include at least a pass code and the user's contact information, determines if a pass code has been entered for the user's secure print job, wherein if the secure print manager determines that a pass code has been entered for the user's secure print job, the secure print manager determines if the entered pass code is correct, wherein if the secure print manager determines that the entered pass code is correct, the secure print manager sends a signal to print the secure print job and notifies the user in accordance with the user's contact information that the secure print job has been printed, otherwise, the secure print manager notifies the user in accordance with the user's contact information that an unauthorized user attempted to print the secure print job.

The disclosed embodiments may further include a method for notifying a user of an attempted secure print job release from an image production device. The method may include receiving a secure print job and secure print job instructions from a user, wherein the secure print job instructions include at least a pass code and the user's contact information, receiving identification information of an image production device operator, determining if a pass code has been entered for the user's secure print job, wherein if it is determined that a pass code has been entered for the user's secure print job, determining if the entered pass code is correct, wherein if it is determined that the entered pass code is correct, retrieving the user's stored profile, determining if the image production device operator is identified as an authorized user in the user's profile, wherein if it is determined that the image production device operator is identified as an authorized user, sending a signal to print the secure print job and notifying the user in accordance with the user's contact information that the secure print job has been printed, otherwise, notifying the user in accordance with the user's contact information that an unauthorized user attempted to print the secure print job.

Most conventional printers, multifunctional devices, etc, support the feature of holding remote secure print jobs until a pass code is input at the local user interface to release the secure print job. However, there is currently no feedback to the secure print job user if an unauthorized user attempts to release their secure print job. This lack of feedback may be a security risk, depending upon the nature of the job attempting to be released, or the location of the device (e.g. Government account, financial institution, etc.).

The disclosed embodiments may concern adding an option to allow a user to receive an alert notification if their remote secure print job, which requires a local pass code on an image production device to be released, has been attempted to be and/or has been released. The notification can be via e-mail, telephone, text message, instant message, web site, personal computer alert, pager, etc.

This function may be used in conjunction with other secure print job security functions including a function which may allow the authorized user to select a time period (for example 1 hour) after which their secure print job may be automatically deleted by the local device if it has not been released/deleted by an authorized user. This function may be accomplished via extending the functionality of the current secure print driver dialog box (refer to example dialog box on next page). The user may have the option to vary the time for each individual secure print job. There may also be a configuration setting available to allow the system administrator to set the duration for how long any secure print job will be held until it is automatically deleted.

FIG. 1 is an exemplary diagram of an image production environment 100 in accordance with one possible embodiment of the disclosure. The image production environment 100 may include a processing device 110 that may be hard-wired or wirelessly connected to an image production device 120.

The processing device 110 may be any device capable to sending a print job to an image production device 120, including a computer, a server, a telephone, or a personal digital assistant, for example. The image production device 120 may be any device that may be capable of printing documents, including a printer, a copier/printer, an office copier/printer, a high-capacity copier/printer, a commercial copier/printer, a facsimile/printer device, or a multi-function device, for example.

Figure 2:
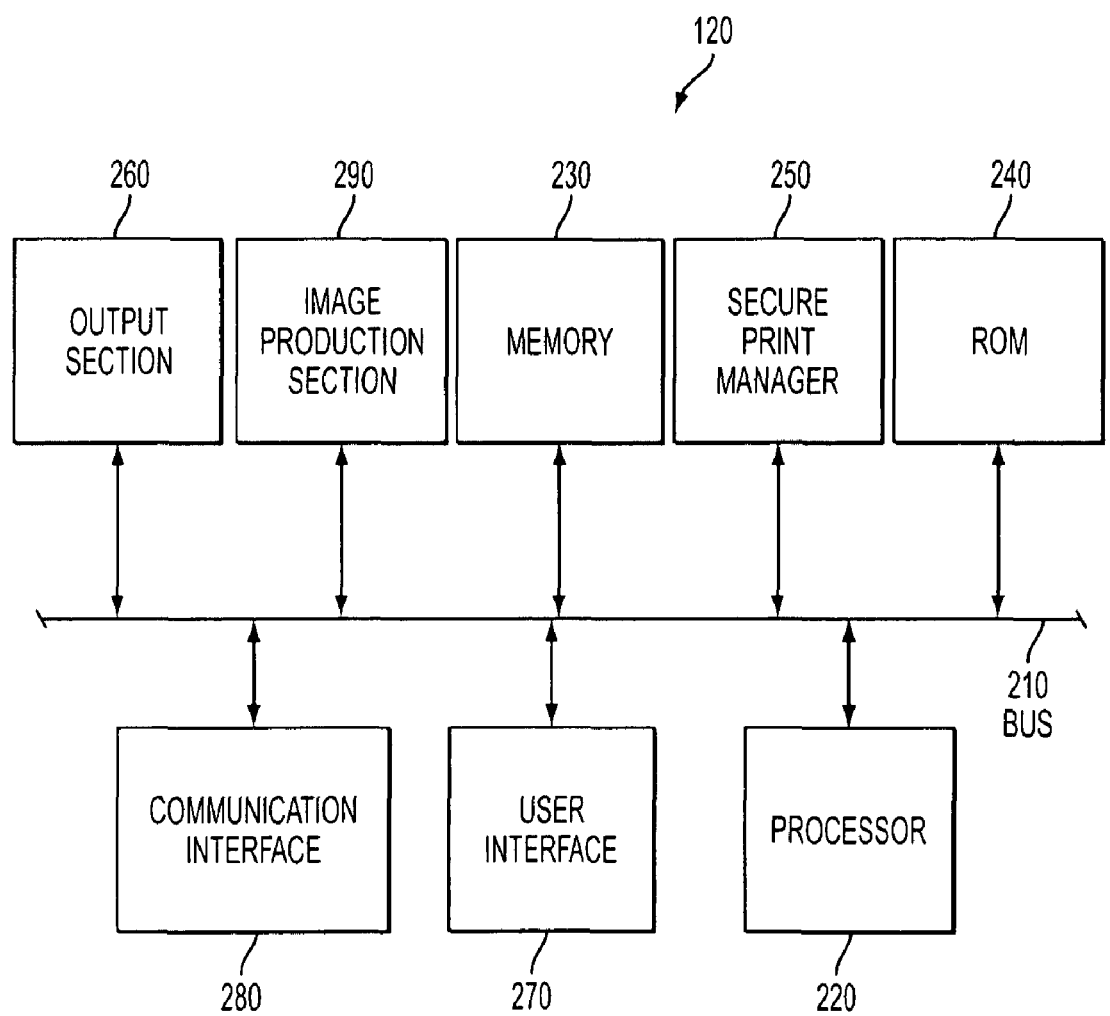
FIG. 2 is an exemplary block diagram of an image production device in accordance with one possible embodiment of the disclosure.

FIG. 2 is an exemplary block diagram of an image production device 120 in accordance with one possible embodiment of the disclosure. The image production device 120 may include a bus 210, a processor 220, a memory 230, a read only memory (ROM 240, a secure print manager 250, an output section 260, a user interface 270, a communication interface 280, and an image production section 290. Bus 210 may permit communication among the components of the image production device 120.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Communication interface 280 may include any mechanism that facilitates communication via a network. For example, communication interface 280 may include a modem. Alternatively, communication interface 280 may include other mechanisms for assisting in communications with other devices and/or systems.

ROM 240 may include a conventional ROM device or another type of static storage device that stores static information and instructions for processor 220. A storage device may augment the ROM and may include any type of storage media, such as, for example, magnetic or optical recording media and its corresponding drive.

User interface 270 may include one or more conventional mechanisms that permit a user to input information to and interact with the image production unit 100, such as a keyboard, a display, a mouse, a pen, a voice recognition device, touchpad, buttons, etc., for example. Output section 260 may include one or more conventional mechanisms that output image production documents to the user, including output trays, output paths, finishing section, etc., for example. The image production section 290 may include an image printing section, a scanner, a fuser section, a toner section, etc., for example.

The image production device 120 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 280.

The image production device 120 illustrated in FIGS. 1-2 and the related discussion are intended to provide a brief, general description of a suitable communication and processing environment in which the disclosure may be implemented. Although not required, the disclosure will be described, at least in part, in the general context of computer-executable instructions, such as program modules, being executed by the image production device 120, such as a communication server, communications switch, communications router, or general purpose computer, for example.

Generally, program modules include routine programs, objects, components, data structures, etc. that perform particular tasks or implement particular abstract data types. Moreover, those skilled in the art will appreciate that other embodiments of the disclosure may be practiced in communication network environments with many types of communication equipment and computer system configurations, including personal computers, hand-held devices, multi-processor systems, microprocessor-based or programmable consumer electronics, and the like.

Figure 3:
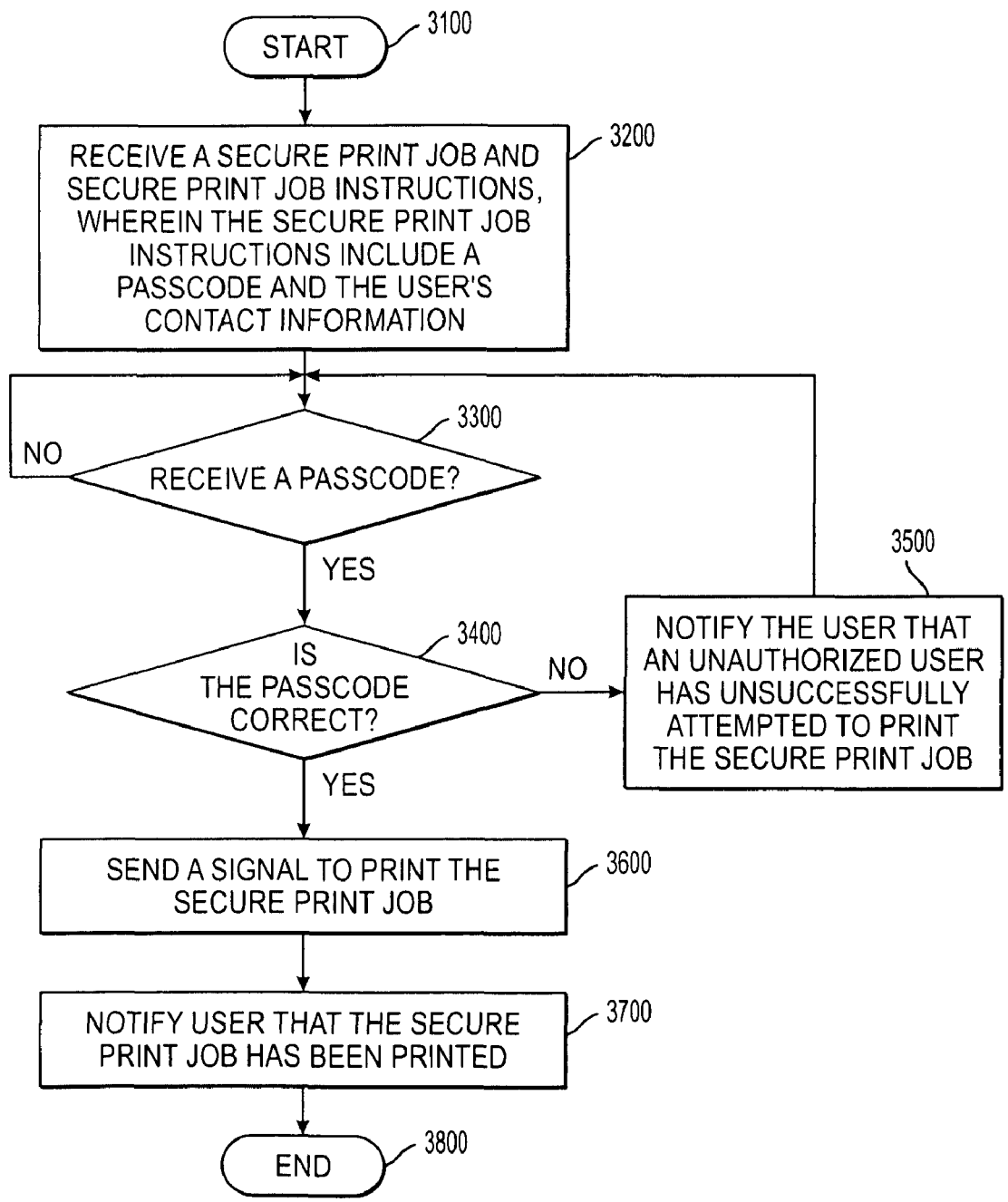
FIG. 3 is a flowchart of an exemplary attempted secure print job release notification process in accordance with one possible embodiment of the disclosure.

For illustrative purposes, the operation of the secure print manager 250 and the exemplary attempted secure print job release notification process are described in FIG. 3 in relation to the block diagrams shown in FIGS. 1-2.

FIG. 3 is a flowchart of an exemplary attempted secure print job release notification process in accordance with one possible embodiment of the disclosure. The process may begin at step 3100, and continues to step 3200 where the secure print manager 250 may receive a secure print job and secure print job instructions from a user and may store the secure print job in the memory 230. The secure print job instructions may include a pass code and the user's contact information, for example.

At step 3300, the secure print manager 250 may determine if a pass code has been entered for the user's secure print job. If the secure print manager 250 determines that a pass code has not been entered for the user's secure print job, the process returns to step 3300, and waits.

If at step 3300, the secure print manager 250 determines that a pass code has been entered for the user's secure print job, at step 3400, the secure print manager 250 may determine if the entered pass code is correct. If the secure print manager 250 determines that the entered pass code is not correct, then at step 3500, the secure print manager may notify the user in accordance with the user's contact information that an unauthorized user attempted to print the secure print job. In this manner, the secure print manager 250 may notify the user of at least one of the identity of the unauthorized user, the time and date of the unauthorized user attempt, and the location of the unauthorized user attempt, for example. In addition, after one or more unauthorized user attempts to print the secure print job, the secure print manager 250 may delete the secure print job automatically or lock the secure print job for a predetermined time period. The process may then return to step 3300.

If at step 3400, the secure print manager 250 determines that the pass code is correct, then at step 3600 the secure print manager may send a signal to print the secure print job. The secure print manager 250 may notify the user in accordance with the user's contact information that the secure print job has been printed. The process may then go to step 3800, and end.

Figure 4A:
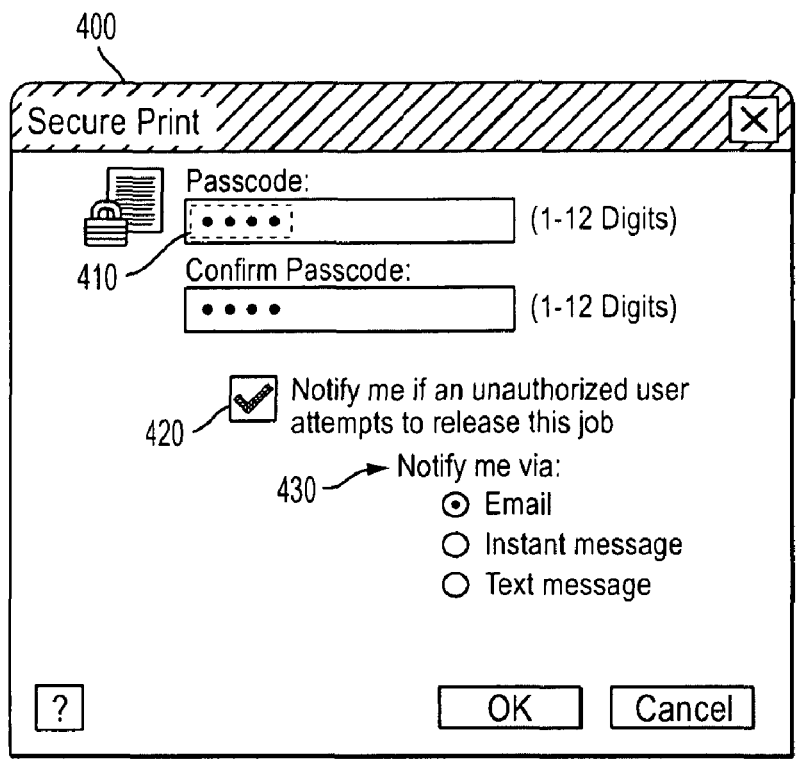
FIGS. 4A and 4B are diagrams of exemplary secure print job user interfaces in accordance with one possible embodiment of the disclosure.
Figure 4B:
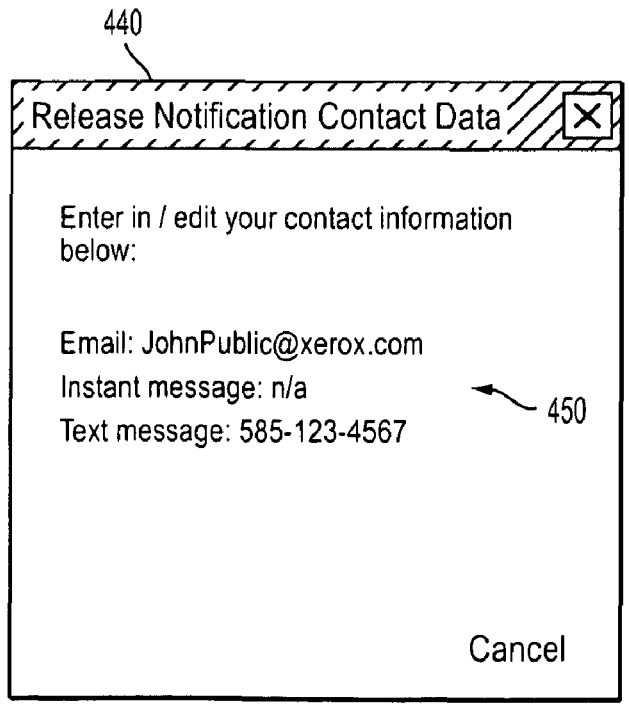

FIGS. 4A and 4B are diagrams of exemplary secure print job user interface screens in accordance with one possible embodiment of the disclosure. The secure print job user interfaces 400, 440 may be presented using a processing device 110, such as computer, a server, a telephone, or a personal digital assistant, for example, and may include areas where the user can enter secure print job instructions.

In particular, in FIG. 4A, the secure print job user interface 400 may include secure print job instructions such as an area that prompts the user to enter (and confirm) a pass code 410, and a notification option 420 that prompts the user to select an option to be notified if an unauthorized user attempts to release the secure print job. Once the notification option 420 is selected, the notification method 430 may be selected.

Once the notification method 430 is selected, another user interface 440 may pop-up to enter in the appropriate the user's contact information 450, for example. The user's contact information 450 may include a telephone number, an e-mail address, a text message address, a pager number, a personal computer alert message, a web site address, or an instant messenger address, for example. The user's contact information may also be pre-stored in memory 230 as part of a user profile and may be presented for verification purposes, for example.

At the image production device 120, the secure print manager 250 may prompt the user at the user interface 270 to enter the pass code 410 that the user previously entered using the secure print job user interface 400 and may determine if the pass code is correct. If the secure print manager 250 determines that the pass code is correct, the secure print manager 250 may enable the secure print job to be printed.

The secure print job may also be released by an authorized person other than the user. For example, the secure print manager 250 may receive identification information of an image production device operator. The secure print manager 250 may receive the pass code, retrieve the user's stored profile and determine if the image production device operator is identified as an authorized user in the user's profile. If the secure print manager 250 determines that the image production device operator is identified as an authorized user, the secure print manager 250 may send a signal to the print the secure print job and notify the user in accordance with the user's contact information that the secure print job has been printed. If the secure print manager 250 determines that the image production device operator is not identified as an authorized user, the secure print manager 250 may notify the user in accordance with the user's contact information that an unauthorized user attempted to print the secure print job.

In this manner, the secure print manager 250 may store information concerning the secure print job in the memory 230. This information may includes the identity of an operator of attempting to release the secure print job from an image production device 120, the time and date of the operator's attempt, and the location of the operator's attempt. The identity of the operator may be established by an identification code, key card, etc., for example.

As an added security measure, the secure print manager 250 may delete the secure print job if the image production device 120 is moved or replaced, for example. The secure print manager 250 may determine if the image production device 120 has been moved if it detects that the image production device 120 has acquires a new internet protocol (IP) address (e.g., by comparison to a previous stored IP address) or through the use of sensors, a global positioning system (GPS) device, etc., for example.

The user interface 400 may include other options (not shown) including an amount of time that must expire 420 before the image production device 120 deletes the secure print job, for example. If the user does not enter a secure print job expiration time 420, the secure print manager 250 may set a default secure print job expiration time, chosen by either of an administrator or the manufacturer, for example. In this manner, the secure print manager 250 may delete the secure print job upon expiration of the default secure print job expiration time.

The secure print manager 250 may send various notifications to the user concerning a secure print job, including that the secure print job that the secure print job has been deleted, for example.

The processing device 110 may also receive a request from the user to modify the secure print job instructions. In this manner, the processing device 110 may prompt the user to enter the pass code 410 previously entered at the secure print job user interface 400. If the pass code is entered correctly, the processing device 110 may prompt the user to modify the secure print job instructions. Once the secure print job instructions are modified, they may be sent to the image production device 120.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hard wired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein. It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for notifying a user of an attempted secure print job release from an image production device, comprising:

receiving a secure print job and secure print job instructions from a user, wherein the secure print job instructions include at least a pass code and contact information of the user;

determining if a pass code has been entered for the user's secure print job, wherein if it is determined that a pass code has been entered for the user's secure print job, determining if the entered pass code is correct, wherein if it is determined that the entered pass code is correct, sending a signal to print the secure print job and notifying the user in accordance with the user's contact information that the secure print job has been printed, otherwise, notifying the user in accordance with the user's contact information that an unauthorized user attempted to print the secure print job;

notifying the user of an identity of the unauthorized user, a time and date of the unauthorized user attempt, and a location of the unauthorized user attempt, deleting the secure print job if the image production device acquires a new internet protocol address; and notifying the user if the secure print job is deleted.

2. The method of claim 1, wherein the user's contact information is at least one of a telephone number, an e-mail address, a text message address, a pager number, a personal computer alert message, a web site address, and an instant messenger address.

3. The method of claim 1, wherein the secure print job may be released by an authorized person other than the user.

4. The method of claim 1, further comprising:

storing information concerning the secure print job that includes at least one of an identity of an operator that attempts to release the secure print job from an image production device, a time and date of the operator's attempt, and a location of the operator's attempt.

5. The method of claim 1, wherein after one or more unauthorized user attempts to print the secure print job, the secure print job is automatically deleted.

6. The method of claim 1, wherein after one or more unauthorized user attempts to print the secure print job, the secure print job is locked for a predetermined time period.

7. The method of claim 1, wherein the image production device is one of a printer, a copier/printer, an office copier/printer, a high-capacity copier/printer, a commercial copier/printer, a facsimile/printer device, and a multi-function device.

8. An image production device, comprising:

a memory; and a secure print manager that receives a secure print job and secure print job instructions from a user and stores the secure print job in the memory, wherein the secure print job instructions include at least a pass code and contact information of the user, determines if a pass code has been entered for the user's secure print job, wherein if the secure print manager determines that a pass code has been entered for the user's secure print job, the secure print manager determines if the entered pass code is correct, wherein if the secure print manager determines that the entered pass code is correct, the secure print manager sends a signal to print the secure print job and notifies the user in accordance with the user's contact information that the secure print job has been printed, otherwise, the secure print manager notifies the user in accordance with the user's contact information that an unauthorized user attempted to print the secure print job, wherein the secure print job manager notifies the user of an identity of the unauthorized user, a time and date of the unauthorized user attempt, and a location of the unauthorized user attempt, wherein the secure print job manager deletes the secure print job and notifies the user that the secure print job is deleted if the image production device acquires a new internet protocol address.

9. The image production device of claim 8, wherein the user's contact information is at least one of a telephone number, an e-mail address, a text message address, a pager number, a personal computer alert message, a web site address, and an instant messenger address.

10. The image production device of claim 8, wherein the secure print job may be released by an authorized person other than the user.

11. The image production device of claim 8, wherein the secure print manager stores information concerning the secure print job in the memory that includes at least one of an identity of an operator that attempts to release the secure print job from an image production device, a time and date of the operator's attempt, and a location of the operator's attempt.

12. The image production device of claim 8, wherein after one or more unauthorized user attempts to print the secure print job, the secure print manager automatically deletes the secure print job.

13. The image production device of claim 8, wherein after one or more unauthorized user attempts to print the secure print job, the secure print manager locks the secure print job for a predetermined time period.

14. The image production device of claim 8, wherein the image production device is one of a printer, a copier/printer, an office copier/printer, a high-capacity copier/printer, a commercial copier/printer, a facsimile/printer device, and a multi-function device.

15. A method for notifying a user of an attempted secure print job release from an image production device, comprising:

receiving a secure print job and secure print job instructions from a user, wherein the secure print job instructions include at least a pass code and contact information of the user;

receiving identification information of an image production device operator;

determining if a pass code has been entered for the user's secure print job, wherein if it is determined that a pass code has been entered for the user's secure print job, determining if the entered pass code is correct, wherein if it is determined that the entered pass code is correct, retrieving the user's stored profile;

determining if the image production device operator is identified as an authorized user in the user's profile, wherein if it is determined that the image production device operator is identified as an authorized user, sending a signal to print the secure print job and notifying the user in accordance with the user's contact information that the secure print job has been printed, otherwise, notifying the user in accordance with the user's contact information that an unauthorized user attempted to print the secure print job;

notifying the user of an identity of the unauthorized user, a time and date of the unauthorized user attempt, and a location of the unauthorized user attempt, deleting the secure print job if the image production device acquires a new internet protocol address, and notifying the user if the secure print job is deleted.

16. The method of claim 15, wherein the user's contact information is at least one of a telephone number, an e-mail address, a text message address, a pager number, a personal computer alert message, a web site address, and an instant messenger address.

17. The method of claim 15, wherein the secure print job may be released by an authorized person other than the user.

18. The method of claim 15, further comprising:

storing information concerning the secure print job that includes at least one of an identity of an operator that attempts to release the secure print job from an image production device, a time and date of the operator's attempt, and a location of the operator's attempt.

19. The method of claim 15, wherein after one or more unauthorized user attempts to print the secure print job, the secure print job is automatically deleted.

20. The method of claim 15, wherein after one or more unauthorized user attempts to print the secure print job, the secure print job is locked for a predetermined time period.

21. The method of claim 15, wherein the image production device is one of a printer, a copier/printer, an office copier/printer, a high-capacity copier/printer, a commercial copier/printer, a facsimile/printer device, and a multi-function device.

* * * * *